Nov. 13, 1956 W. W. FUNK 2,770,070
AGRICULTURAL PESTICIDE DISTRIBUTING APPARATUS
Filed Dec. 24, 1952 7 Sheets-Sheet 1

INVENTOR
WELKER W. FUNK
BY Hans G. Hoffmeister
ATTORNEY

Nov. 13, 1956   W. W. FUNK   2,770,070
AGRICULTURAL PESTICIDE DISTRIBUTING APPARATUS
Filed Dec. 24, 1952   7 Sheets-Sheet 4

INVENTOR
WELKER W. FUNK
BY Hans G. Hoffmeister
ATTORNEY

Nov. 13, 1956 W. W. FUNK 2,770,070
AGRICULTURAL PESTICIDE DISTRIBUTING APPARATUS
Filed Dec. 24, 1952 7 Sheets-Sheet 7

INVENTOR
WELKER W. FUNK
BY *Hans G. Hoffmeister*
ATTORNEY

United States Patent Office 2,770,070
Patented Nov. 13, 1956

2,770,070

AGRICULTURAL PESTICIDE DISTRIBUTING APPARATUS

Welker W. Funk, Medina, N. Y., assignor to Food Machinery and Chemical Corporation, San Jose, Calif., a corporation of Delaware Application December 24, 1952, Serial No. 327,874

11 Claims. (Cl. 43—148)

The present invention relates to an agricultural pesticide distributing apparatus of the type adapted to discharge an air blast in which is entrained either dust or spray, or a mixture of dust and spray, for contact with trees, bushes and field crops or the like.

One object of the present invention is to provide an improved agricultural pesticide distributing apparatus of the type referred to above.

Another object is to provide a pesticide distributing apparatus of the air blast type having an improved mechanism for delivering pesticide to the air blast.

Another object is to provide a pesticide distributor of the type having an air blast creating fan whereby pesticidal material may be uniformly entrained in the air blast without coming into contact with the air impelling blades of said fan.

Another object is to provide an improved dust feeding mechanism for discharging dust from a dust supply hopper into the dust feeding air stream of a pesticide distributing apparatus.

A further object is to provide a pesticide distributing apparatus of the air blast type having an improved air blast shaping and discharging mechanism.

These and other objects and advantages of the present invention will become apparent from the following description and the accompanying drawings in which:

Figs. 3A and 3B are complementary enlarged longitudinal sectional views of the dust feeding mechanism and the fan and discharge head, respectively, of the machine shown in Fig. 1, some parts being shown in elevation and others being omitted.

Fig. 7 is an enlarged horizontal section taken substantially along line 7—7 of Fig. 2, certain parts being broken away while other parts are shown in elevation.

Fig. 8 is an enlarged horizontal section taken substantially along line 8—8 of Fig. 4, certain parts being shown in elevation.

Fig. 9 is a diagrammatic view of the control box for the machine and the electrical circuit for the shutter actuating motor.

Figure 1:
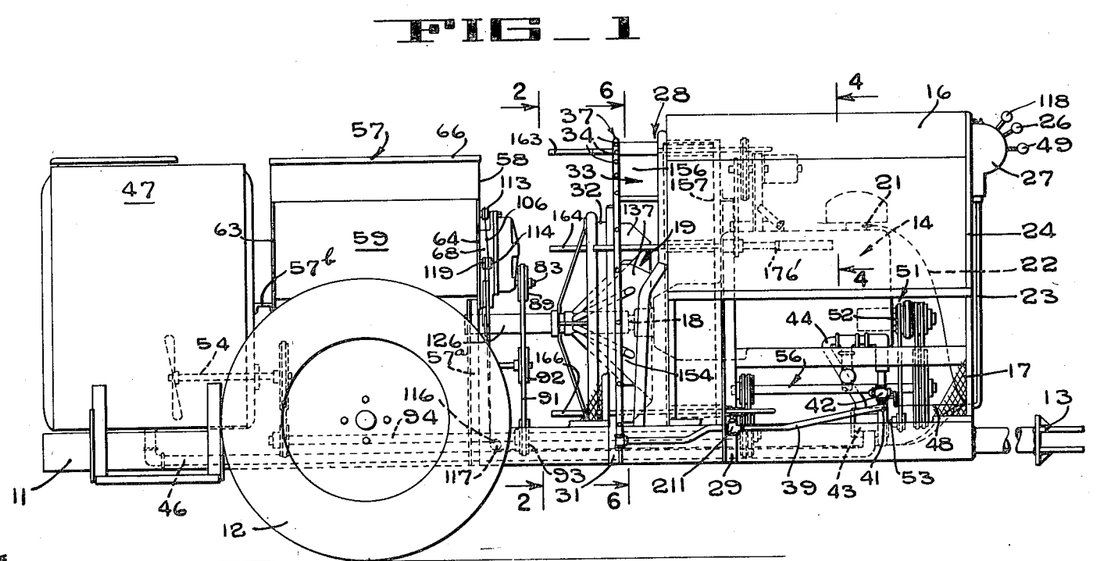
Fig. 1 is a side elevation of a spraying and dusting machine embodying the present invention, certain parts being broken away.

The pesticide spraying and dusting machine of the present invention comprises a frame 11 supported above the ground by wheels 12 only one of which has been shown in Fig. 1. The front end of the frame 11 is provided with a hitch mechanism 13, projecting forwardly therefrom, by which the machine can be attached to a tractor, not shown, for propulsion thereby between rows of plants, such as trees in an orchard.

Figure 2:
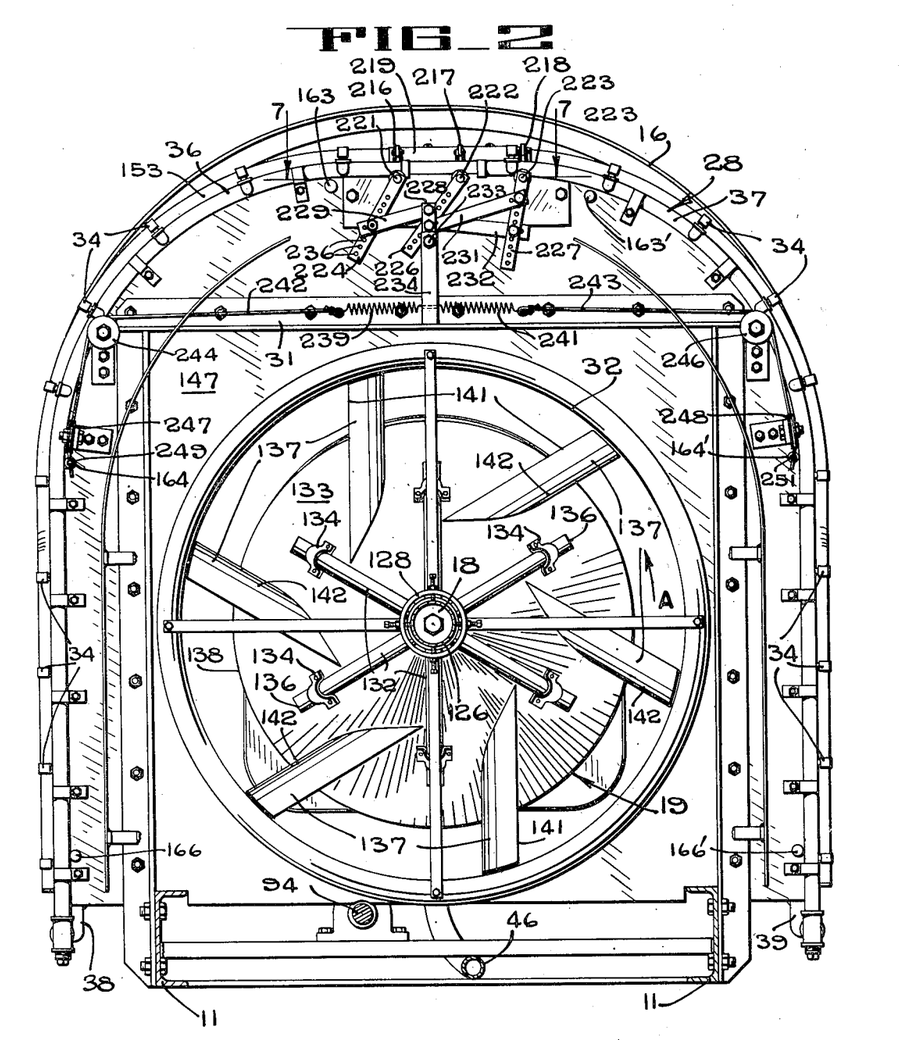
Fig. 2 is an enlarged vertical transverse section taken along the line 2—2 of Fig. 1, certain parts being shown in a different position than in Fig. 1, and other parts being broken away.
Figure 3B:
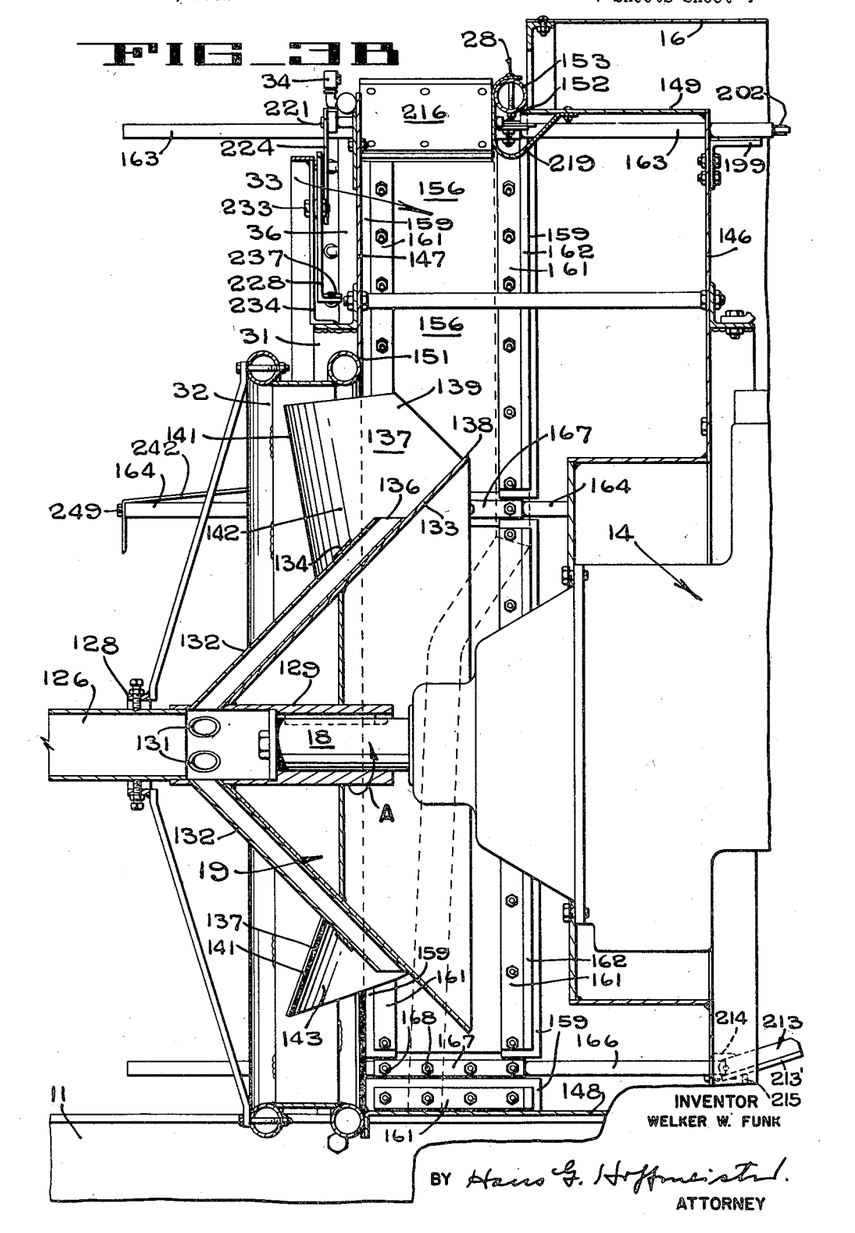

An internal combustion engine 14 is supported at the forward end of the frame 11 beneath a hood 16, the lower side portions of which are grilled, as shown at 17, to admit cooling and combustion air to the engine. The main engine drive shaft 18 projects rearwardly from the engine and has a mixed flow fan 19 rigidly mounted thereon for rotation therewith in the direction of the arrow A (Figs. 2 and 3B). The speed of rotation of the fan 19 is, of course, dependent upon the speed of the engine 14. The engine throttle 21 (Fig. 1) is controlled by a cable 22 that runs through a flexible tube 23 fastened to the forward wall 24 of the hood 16 and connects with an operating lever 26 mounted in a control box 27 secured to the forward hood wall 24. Thus, the speed of the engine 14 and the fan 19 may be conveniently controlled from the front of the machine.

A discharge head 28 surrounds the fan 19 and the rear end of the engine 14 and is fastened to the frame 11 by front and rear vertical supporting frames 29 and 31, respectively. The fan 19 is adapted to draw a large stream of air into the discharge head 28 through a cylindrical intake collar 32 for discharge as an air blast upwardly and laterally of the machine through an arched, transverse opening 33 in the discharge head.

Liquid, such as water or pesticidal solution, is introduced into the air blast as it issues from the discharge head 28 by spray nozzles 34. These nozzles are carried by two header pipes 36 and 37 (Fig. 2) fastened to said discharge head 28 adjacent the rear margin of its air blast discharge opening 33 (Fig. 1). The nozzles 34 are adapted to direct jets of spray material forwardly over the opening 33 where it is immediately picked up by the air blast emanating from the discharge head 28 and is intimately mixed therewith. Liquid is supplied to the header pipes 36 and 37 through pipes 38 and 39, respectively, fastened to a T-connection 41 on the discharge side of a valve 42. The valve 42 is connected with the discharge side of a centrifugal pump 43 through a pipe line 44 and said pump is supplied with liquid through a pipe line 46 from a supply tank 47 mounted on the rear end of the frame 11. The valve 42 is controlled by a flexible cable 48 fastened to a lever 49 mounted in the control box 27. Thus, the quantity of liquid supplied to the header pipes 36 and 37 may be regulated from the front of the machine.

The pump 43 is driven by the engine 14 through a V-belt and pulley assembly 51 operatively connecting an auxiliary drive shaft 52, extending forwardly from the front of the engine, with the pump shaft 53. The auxiliary shaft 52 also drives an agitator device 54 mounted in the tank 47 through a series of shafts, V-belts and pulleys 56 mounted along the lower portion of the machine. The device 54 vigorously agitates the liquid in the tank to thereby thoroughly mix the same with any pesticidal material placed therein.

Pesticidal dust is supplied to the air blast from a dust feeding apparatus 57 (Figs. 1, 3A and 5) supported in front of the liquid tank 47 by a vertical auxiliary frame 57a welded to the main frame 11 and a horizontal channel 57b fastened to the front end of the liquid tank 47. The dust feeding apparatus 57 comprises a hopper 58 having sides 59 and 61, a rounded floor 62 and flat end walls 63 and 64. A cover 66 (Fig. 3A) fits over the upper margin of the sides 59 and 61 and the end walls 63 and 64 and is held in place by toggle fasteners 67 (only one of which is shown).

A dust feed housing 68 (Figs. 3A and 5) is bolted to the lower portion of the front end wall 64 of the hopper 58 which is provided with two vertically aligned apertures 69 and 71 establishing communication between the hopper 58 and a chamber 72 formed in said housing 68. The pesticidal dust in the hopper 58 is adapted to be continuously agitated and urged toward the front end wall 64 of the hopper and the lower opening 71 therein by a helical rod 73 supported from a sleeve 74. The sleeve 74 is rigidly mounted on a shaft 76 that extends through the aperture 69 and is journaled at its forward end in bearings 77 and 78 provided in the housing 68 and a gear case 79 bolted to the front wall of the housing 68. The rear end of said shaft 76 is journaled in a bearing 81 (Fig. 3A) secured to the rear hopper wall 63. The dust pushed toward the front of the hopper 58 by the helical rod 73 is adapted to be forced through the lower aperture 71 and into the chamber 72 by a semi-circular plate 82 fastened in an inclined position to a shaft 83.

The shaft 83 is journaled in bearings 84 and 86 provided in the housing 68 and gear case 79, respectively, and it has a pinion 87 securely mounted thereon between said bearings. The pinion 87 meshes with a spur gear 88 rigidly mounted on the shaft 76 between the bearings 77 and 78 thereby connecting the shafts 76 and 83 for rotation in opposite directions. The forward end of the shaft 83 extends through the forward wall of the gear case 79 and has a pulley 89 secured thereon. The pulley 89 is adapted to be continuously rotated in the direction of the arrow B (Fig. 3A) by a belt 91 trained around an idler pulley 92 (Fig. 1) and a drive pulley 93 which is fastened to a shaft 94 of the drive mechanism 56 connected with the auxiliary drive shaft 52. It will thus be seen that by means of the above described actuating mechanism the helical rod 73 and the tilted plate 82 are continuously turned during operation of the machine 10, thereby constantly supplying dust to the chamber 72.

A rotor 96 (Figs. 3A and 5) fixedly mounted on the shaft 83 within the chamber 72 performs the dual function of agitating the dust forced into said chamber through the opening 71 and feeding said dust to a rectangular opening 97 formed in the bottom of the feed housing 68. The opening 97 is covered by an elongated rectangular flexible strap 98 the ends of which are removably supported from angle brackets 99, 101 secured to opposite sides of the housing 68. A longitudinal feed slot 102 is formed in the strap 98 below the feed housing opening 97. The flow of dust through the feed slot 102 may be regulated by an elongated slide 103 formed of thin flexible metal and provided with a control slot 104 for cooperation with the feed slot 102 in the strap 98. Said control slot 104 is equal in length to the feed slot 102 but is slightly wider than said slot 102, as may be seen in Fig. 3A.

The slide 103 is held tightly against the lower surface of the strap 98 by a cable 106 (Fig. 5) the opposite ends 107 and 108 of which are fastened to the opposite ends 109 and 111, respectively, of the slide 103. From its point of connection with the end 111 of the slide 103 the cable 106 passes around a fixed axis pulley 112, over an adjustable axis pulley 113, down along the outer side of a pulley 114 and around the outer sheave 116 (Fig. 1) of a double pulley 117 mounted on the frame 11. The cable then leads to the front of the machine where it enters the flexible tube 23 and connects with a cable control apparatus located within the control box 27. This cable control apparatus is not shown but is similar to that disclosed in U. S. Patent No. 2,604,357 for a Spraying Machine granted to G. W. Daugherty. Said cable control apparatus is actuated by a lever 118 mounted on the control box 27. The cable 106 then doubles back through the tube 23, runs under the inner sheave (not shown) of the double pulley 117, loops around a pulley 119 mounted to the rear and coaxially of the pulley 114 and connects with the end 109 (Fig. 5) of the slide 103. Vertical movement of the lever 118 simultaneously moves the ends 107 and 108 (Fig. 5) of the cable 106 in opposite directions thereby moving the control slide 103 along the strap 98. Hence, the degree to which the feed slot 102 is opened by the control slot 104 and thus the dust feed rate may be remotely controlled by the operator from the front of the machine.

Figure 5:
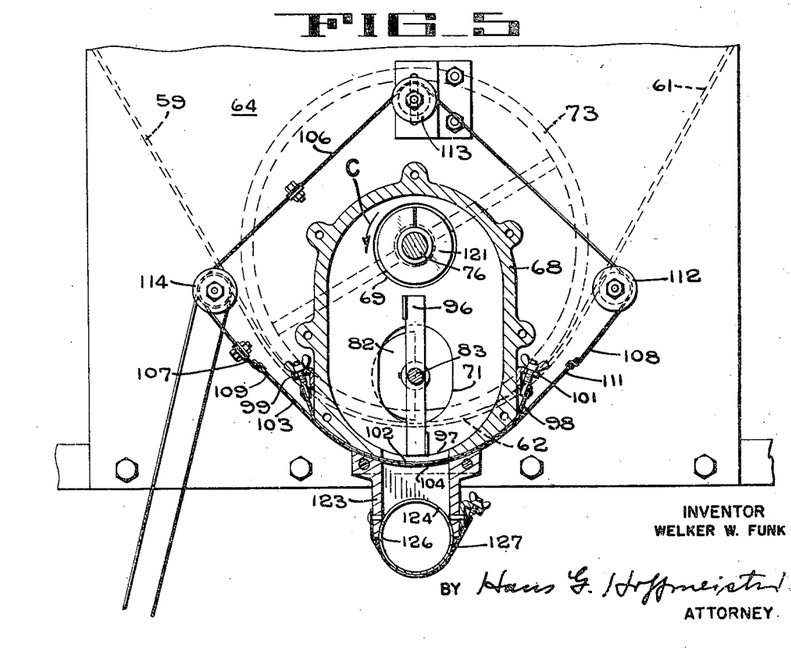
Fig. 5 is a vertical section taken along line 5—5 of Fig. 3A.

Since the speed of rotation of the helical rod 73 and the inclined plate 82 is determined by the speed of the engine 14 the rate at which they supply dust to the feed housing 68 (Fig. 3A) will be constant for any particular engine speed. Hence, when the control slide 103 is set for a low rate of dust discharge, dust may be forced into the chamber 72 faster than it is fed out. Under these circumstances the excess dust will eventually fill the chamber 72 and if some relief therefore is not provided, considerable heat and pressure will be generated in said chamber. Accordingly, a right hand feed screw 121 is secured on the shaft 76 between the sleeve 74 and the forward wall 122 of the feed housing 68, said feed screw operating to return the excess dust to the hopper 58 through the opening 69 in the forward hopper wall 64 as the shaft 76 turns in the direction of the arrow C (Figs. 3A and 5).

A dust chute 123 (Figs. 3A and 5) is fastened to the feed housing 68 in alignment with the opening 97 therein, and in contact with the lower surface of the control slide 103. The lower end of said chute 123 is arcuately shaped to fit closely around a circumferential slot 124 provided in the rear upper surface of a longitudinally extending pipe 126. A flexible strap 127 secured at its ends to the sides of the chute 123 clamps the rear end of the pipe 126 to the chute 123 and maintains the slot 124 in alignment with said chute.

The pipe 126 is rigidly supported adjacent its front end by means of an adjustable spider bracket 128 (Figs. 2 and 3B) bolted to the rear edge of the collar 32. The front end of the pipe 126 (Fig. 3B) is telescoped within the hollow, open-ended hub 129 of the fan 19. Just forward of the front end of the pipe 126, the hub 129 is provided with a circumferential series of elliptical openings 131 which receive the inner beveled ends of a conical series of forwardly inclined, outwardly extending tubes 132. A frusto-conical deflector 133 is co-axially secured to the hub 129 immediately forward of the conical array of the tubes 132, said deflector serving as a brace for said tubes which are held against the outer surface of said deflector by U-shaped clamps 134. The outer end of each tube 132 is beveled to provide an enlarged elliptical orifice 136. Laterally adjacent the orifice 136 of each tube 132 a blade 137 is welded to the outer surface of the deflector 133 near its forward edge 138. The blades 137 are straight along their forward portion 139, but are curved in the direction of fan rotation at their rear portion 141. Said blades are so arranged on the deflector 133 that their rear faces 142 are closer to the tube orifices 136 than are their front faces 143 (Fig. 3B), as may be seen in Figs. 2 and 6.

It will be readily seen that rotation of the fan 19 in the direction of the arrow A (Figs. 2, 3B and 6) pulls a large primary stream of air through the collar 32, past the tubes 132 and the fan blades 137 and into the discharge head 28. The air pressure at the tube orifices 136 (Fig. 3B) is thus considerably less than the pressure at the rear open end 144 (Fig. 3A) of the pipe 126 which is positioned well back of the fan 19 and is, therefore, at practically atmospheric pressure. Consequently, a relatively small secondary stream of air is caused to flow forwardly through the pipe 126, the chambered hub 129, and the tubes 132 to the orifices 136 where it mingles with the primary stream of air entering through the collar 32. The movement of the secondary air stream through the pipe 126 and tubes 132 is aided by centrifugal force which acts to impel air within the tubes 126 outwardly from the hub 129 toward the openings 136.

In operation, the dust discharged from the feed housing 68 (Fig. 3A) into the chute 123 falls through the circumferential slot 124 into the pipe 126 where it is entrained in the secondary stream of air passing therethrough. When this dust laden secondary air stream issues from the tube openings 136 (Fig. 3B) it is caught up in the primary air stream and moves outwardly beyond the forward edge of the fan blades 137. It should be noted here that the path of the dust after it leaves the tube openings 136 is such that it does not contact the blades 137 but passes outwardly and forwardly between them. Since the dust does not strike the fan blades abrasion thereof by particles of dust and caking of dust on the blades is prevented, thereby eliminating vibration of the machine due to unbalancing of the fans by abrasion and caking of dust on the blades.

The dust leaving the orifices 136 is thoroughly mixed inside the discharge head 28 with the pirmary air stream which issues from the opening 33 in said discharge head 28 in the form of a voluminous pesticidal air blast. Immediately beyond the opening 33 the dust filled air blast encounters the fine spray from the nozzles 34 which becomes entrained in said air blast thus forming a dense pesticidal fog for the complete envelopment of the plants being treated.

While the above description assumes that both liquid and dust are being supplied to the air blast emanating from the discharge opening 33, it is obvious that the discharge of either liquid or dust may be reduced or cut off by the manipulation of their respective control levers 49 and 118.

The discharge head 28 (Fig. 3B) comprises front and rear walls 146 and 147, respectively, a floor 148, and an arch-shaped, transverse wall 149, that forms the top and sides of said head. The rear wall 147 is provided with a circular air intake opening 151 that has the cylindrical collar 32 secured around its periphery and extending rearwardly therefrom. The rear edge 152 of the transverse wall 149 is spaced from the rear wall 147 of the discharge head 28 and is strengthened by a piece of circularly cross-sectioned tubing 153 that is welded to it throughout its length. The tubing 153 and the rear wall 147 of the discharge head 28 form the front and rear margins, respectively, of the previously mentioned air blast discharge opening 33. Said opening is symmetrical with respect to a longitudinal vertical plane passing through the axis of rotation of the fan 19. However, the opening 33 is wider across its transversely-curved top portion than it is along its vertical side portions, since, as may be seen at 154 in Fig. 1, the front margin of said opening is inclined rearwardly at its side portions.

There are times when it is desirable to vary the amount or pattern of pesticide laden air discharged to one side or the other of the machine. For instance, when the outer side of the last row of trees in an orchard is being treated it is desirable from the standpoint of economy to completely eliminate the discharge of air and pesticide from the side of the machine facing away from the orchard. Therefore, in order to alter the pattern and quantity of the air and pesticide discharged from the opposite sides of the machine, the discharge head 28 is provided with a pair of shutters 156 and 157 (Figs. 3B, 6 and 8) adapted to close the left and right portions, respectively, of the discharge opening 33. The shutters 156 and 157 are similar in construction and mode of operation and, therefore, a specific description of the shutter 156 mounted at the left side of the machine will serve as a description of the shutter 157 at the right side of the machine. The parts of the shutter 157 that correspond to the described parts of the shutter 156 will be indicated in the drawings by identical numerals with a prime (') added.

The shutter 156 (Figs. 3B, 6 and 8) comprises a vertically elongated metal sheet 158 shaped to be positioned closely parallel to the inner surface of the transverse wall 149 at the left side of the machine. Said shutter has rubber strips 159 secured adjacent its edges by clamp plates 161 that are bolted to said sheet 158. The strips 159 (Fig. 8) extend outwardly beyond the edges of the sheet 158 thus providing it with flexible margins capable of sealing engagement with the walls and floor of the discharge head. The clamp plates 161 fastened at the forward edge of the sheet 158 extend beyond the edge of said sheet and are bent outwardly, as shown at 162, so that they hold the rubber strips 159 associated therewith tightly against the transverse wall 149 of the discharge head 28, thereby preventing the leakage of air between the sheet 158 and the transverse wall 149 of said discharge head.

The shutter 156 (Fig. 3B) is mounted within the discharge head 28 for movement across the opening 33 by means of three longitudinally extending shafts 163, 164 and 166 slidably mounted in the front and rear walls of the discharge head 28. Said shafts are fixed to the inner side of the sheet 158 by means of U-shaped brackets 167 (Fig. 6) and a plurality of bolts 168.

The left shutter 156 is actuated by a drive assembly 169 (Fig. 8) associated with the left shutter shaft 164. Said assembly is mounted in a bearing bracket 171 bolted to the rear wall 146 of the discharge head 28. A tube 172 is rotatably mounted in the bracket 171 and is held therein against axial movement by a collar 173 secured to the tube 172 at one end of the bracket 171 and a sprocket wheel 174 secured to said tube at the opposite end of said bracket.

A left handed nut 176 is welded to the forward end of the tube 172 in axial alignment therewith and a tube 177 is in turn fastened to the forward end of said nut. The front end of the shaft 164 is provided with left handed threads 178 and it extends forwardly through the tube 172 and into mating engagement with the nut 176.

The right shutter 157 (Fig. 1) is actuated by a drive assembly 169' (Fig. 4) associated with the right shutter shaft 164'. The drive assembly 169' will not be specifically described since it is similar in construction, arrangement, and mode of operation to the drive assembly 169 except that the cooperating threads on the shaft 164' and in the nut 176' (Fig. 1) are right handed rather than left handed as is the case with the drive assembly 169 (Fig. 8). The parts of the drive assembly 169' which correspond with the described parts of the assembly 169 will be indicated in the drawings by identical numerals with a prime (') added.

The drive assemblies 169 and 169' are adapted to be rotated simultaneously in the same direction by a continuous chain 181 (Fig. 4) trained around the sprocket wheels 174 and 174'. Since the assemblies 169 and 169' are provided with drive threads of opposite hand the rotation of said assemblies in the same direction will cause the shutters associated therewith to slide longitudinally in opposite directions. Thus, when one shutter is in its rearmost and completely closed position, the other is in its foremost and fully open position, as may be seen in Figs. 1 and 6, where the left shutter 156 is shown completely closed and the right shutter 157 is shown completely open.

The chain 181 (Fig. 4) is also trained around a pair of take-up sprockets 182 and 183 and a drive sprocket 184 rigidly mounted on the rear end of a longitudinal shaft 186 journaled in a frame 187 fastened to the engine 14. A pulley 188 is securely mounted on the shaft 186 forwardly of the sprocket 184, said pulley being driven by a V-belt 189 from a reversible direct-current, electric motor 191 attached to the frame 187.

Figure 4:
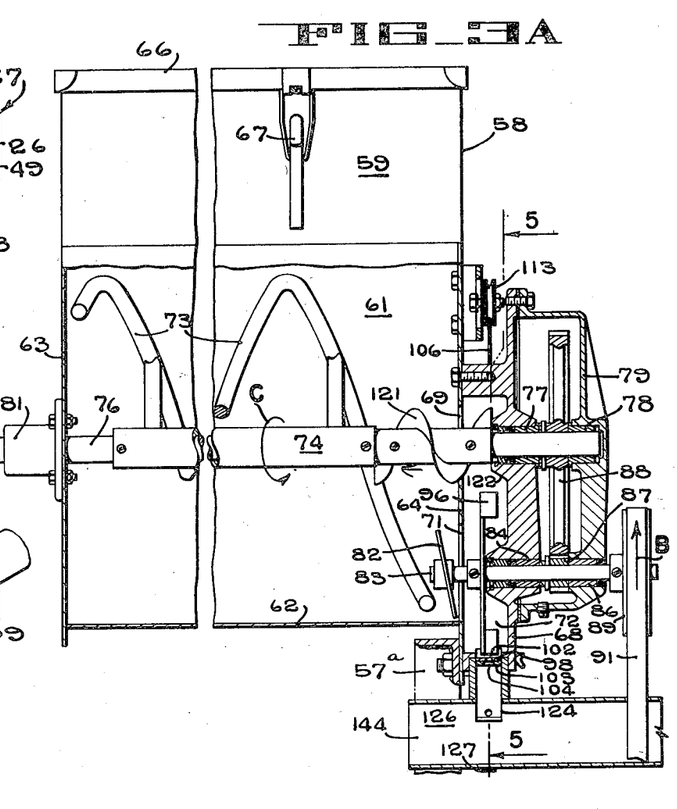
Fig. 4 is an enlarged vertical section taken along line 4—4 of Fig. 1.

The motor 191 (Fig. 9) may be alternatively connected in series with a storage battery 192 through either one of two circuits 193 and 194 by a double throw switch 196 mounted on the control box 27. The circuits 193 and 194 contain limit switches 197 and 198 biased toward an open position. Said switches 197 and 198 are secured on brackets 199, 201 (Figs. 3B and 4) fastened to the forward wall 146 of the discharge head adjacent the upper shutter shafts 163 and 163'. The actuating arms 202, 203 of said switches 197 and 198 extend into the path of the upper shutter shafts 163, and 163', respectively, and are adapted to be held thereby in a closed position except when the shutter associated therewith is in its fully closed position, as exemplified by the shutter 156 in Figs. 1, 3B, 4, 6 and 8. At this time the upper shutter shaft will be retracted out of engagement with the actuating arm of its associated switch thereby allowing said switch to open, as shown in Figs. 3B, 4 and 9 in connection with the switch 197.

The operation of the shutters will be described with specific reference to Figs. 1, 3B, 4, 6, 8 and 9 all of which show the left shutter and its associated control mechanism in a closed position. If it is desired to open the left shutter 156 the operator will throw the switch 196, located conveniently on the control box 27 at the front of the machine, into engagement with the contacts 204 and 206 in the circuit 198 thereby closing said circuit and causing the motor 191 to rotate counterclockwise, as seen in Fig. 4. This effects a counterclockwise rotation of the chain 181 and the sprocket wheels 174 and 174' which causes the left shutter 156 to move forwardly as the right shutter 157 simultaneously moves rearwardly.

The shutters may be stopped in any desired fore and aft position merely by moving the switch 196 out of engagement with the contacts 204, 206 and into its middle, or off, position, thus stopping the motor 191. At the first forward movement of the left shutter 156 the shaft 163 (Fig. 4) engages the switch arm 202 thereby closing the switch 197 and preparing the circuit 193 for operation. After the switch 197 has been closed the shutters 156 and 157 may be returned to their original positions, shown in Figs. 1, 3B, 4, 6, 8 and 9, by moving the switch 196 (Fig. 9) into engagement with the contacts 207 and 208 in the circuit 193 thereby closing said circuit. The circuit 193 is so arranged that it reverses the direction of current flow through the motor 191 thereby causing said motor to rotate in a direction opposite to that resulting from the use of the circuit 194. Thus, the chain 181 will be rotated clockwise and the shutters 156 and 157 will be moved in an opposite direction from that which was first described. When it is desired to completely close a certain shutter the operator needs merely to connect the switch 196 with the circuit that gives the proper direction of rotation to the motor 191 and when the shutter reaches its completely closed position its upper shaft will disengage with the limit switch in said circuit, allowing it to open, thereby automatically stopping the motor 191. It will be apparent from the above description that the entire pesticidal air blast generated by the fan 19 may be directed to either one side or the other of the machine, or that it may be proportionately divided, one part being discharged to one side of the machine and the remainder of the blast being discharged to the other side thereof.

Figure 10:
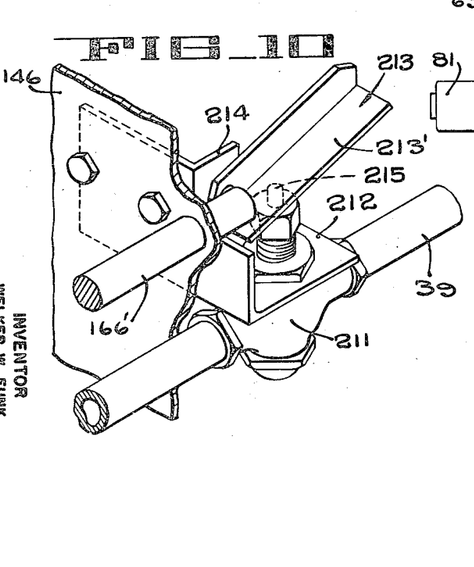
Fig. 10 is a perspective view of one of the automatic spray control valves.
Figure 11:
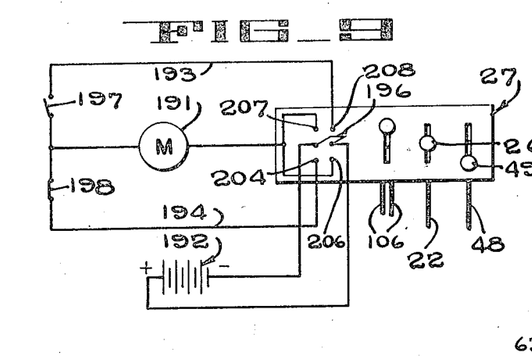

In order to prevent the discharge of liquid from the nozzles associated with a header pipe 36 or 37 when the shutter adjacent that header pipe is completely closed, the lines 38 and 39 (Fig. 1) which supply liquid to said header pipes are each provided with a valve 211 (only one being shown). Each valve 211 is supported from the forward side of the forward wall 146 of the discharge head 28 by an angle 212 (Fig. 10) and is arranged to be controlled by the associated lower shutter support shaft 166 or 166' through an actuating lever 213 pivotally mounted on a forwardly bent ear portion 214 of the angle 212. The stem 215 of the valve is biased by a spring (not shown) within the valve, toward an upper position in which the valve is closed, but is held in a lower valve-opening position by the shaft 166 or 166', as the case might be, except when the associated shutter is completely closed. At this time the lower shutter shaft is in its rearmost position and its forward end is removed from contact with the valve actuating lever 213, permitting the lever 213 to swing upward as shown in Fig. 10, and allowing the valve stem 215 to rise, closing the valve and thereby interrupting the discharge of liquid from its associated header pipe. Reopening of the valve will be accomplished immediately upon forward movement of its associated shutter since this will bring the forward end of the lower shutter shaft again into engagement with the valve actuating lever 213. As is best shown in Fig. 3B, the parts are so arranged that as the shutter shaft moves forward, its leading end slides along the upper face of the inclined, laterally extending flange 213' of the lever 213, causing the lever to swing down, thus depressing the valve stem 215 and thereby opening the valve 211.

The upper edges of the shutters 156 and 157 (Fig. 6) are spaced a considerable distance from each other thereby providing an area along the top of the discharge opening 33 which is unobstructed by said shutters. Adjustable air deflecting means, in the form of three vanes 216, 217 and 218 is provided in said area to divert the air issuing therefrom transversely of said machine. The vanes 216, 217 and 218 (Fig. 7) are pivotally supported in the rear wall 147 of the discharge head 28 and in a bracket 219 secured in a depending position to the rear edge of the transverse wall 149 of said discharge head by shafts 221, 222 and 223. The vanes 216, 217 and 218 have arms 224, 226 and 227 (Figs. 2 and 7) adjustably secured in a downwardly extending position to the rear end of their respective shafts. The arms 224 and 227 are pivotally connected with the upper end of a master lever 228 by links 229 and 231, respectively, and the arm 226 is pivotally connected to the arm 227 by means of a link 232. The master lever 228 is pivoted at 233 to an upright brace 234 (Figs. 2, 3B and 7) welded to the rear supporting frame 31. Rotation of the master lever 228 on its pivot will simultaneously tilt all of the air deflecting vanes, a clockwise rotation of the lever 228 causing a counterclockwise rotation of said vanes, and vice versa. The arms 224, 226 and 227 and their actuating links 229, 232 and 231 are each formed with a plurality of apertures 236 (Fig. 2) in order that said arms and links may be pivotally connected in many different positions. Hence, the amount of tilting of each individual deflecting vane upon movement of the master lever 228 may be independently regulated, thereby making possible a variety of air blast discharge patterns.

The lower end of the master lever 228 (Fig. 3B) is bent forwardly to form an attaching ear 237 which is provided centrally with a hole 238 (Fig. 7). The inner rebent ends of two laterally extending springs 239 and 241 are hooked through the hole 238 in said ear while the outer ends of said springs are attached to cables 242 and 243, respectively. Said cables 242 and 243 are trained over transversely positioned pulleys 244 and 246 (Fig. 2) and under longitudinally positioned pulleys 247 and 248, respectively, rotatably supported from the rear wall of the discharge head 28. Said cables then pass rearwardly and are clamped to the after end of the shutter drive shafts 164 and 164' by tap bolts 249, 251.

Figure 6:
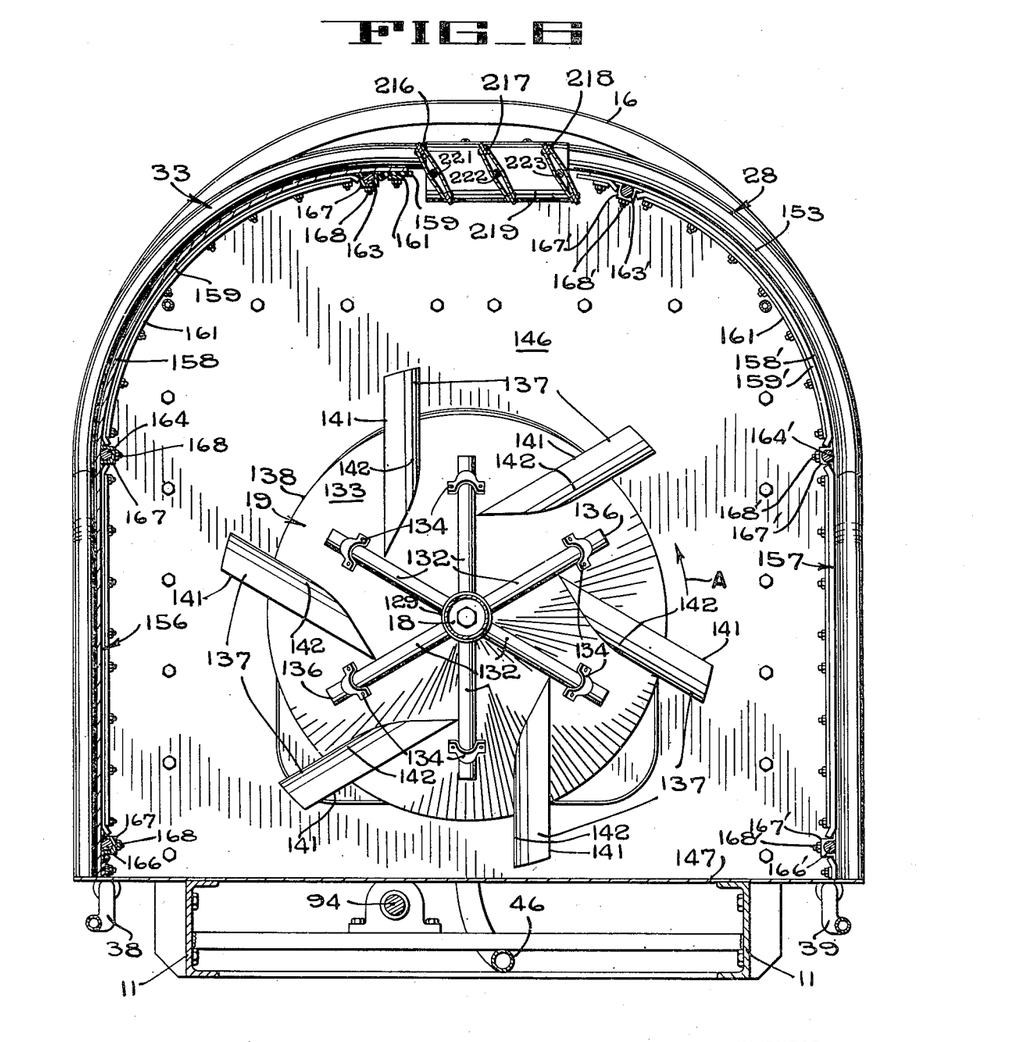
Fig. 6 is an enlarged vertical section taken along line 6—6 of Fig. 1, certain parts being shown in elevation.

From the foregoing description it will be apparent that the master lever 228 and hence the position of the air deflecting vanes 216, 217 and 218 is controlled by the position of the shutters 156 and 157. Figs. 2 and 7 show the position of the deflecting vanes and their actuating mechanism when the shutters 156 and 157 are in their half closed position. At this time the air deflecting vanes 216, 217 and 218 are upright and the air blast generated by the fan 19 (Fig. 2) is discharged to both sides of the machine in a pattern that is symmetrical with respect to a vertical plane passing through the center line of said machine. When it is desired to restrict or entirely cut off the discharge of air and pesticide to one side or the other of the machine, the switch 196 (Fig. 9) is thrown into contact with the appropriate motor circuit whereupon the motor 191 (Fig. 1) operates to move the shutter on the chosen side rearwardly and to simultaneously move the opposite shutter forwardly, Figs. 1, 3B and 6 show the position of the shutters 156 and 157 and the vanes 216, 217 and 218 when the left shutter is in its completely closed position and the entire air blast is issuing from the right side and top portions of the discharge opening 33. Opposite, complementary movement of the shutters 156 and 157 from their half open position to a position where the left shutter 156 is completely closed and the right shutter 157 is entirely open, moves the cables 242 and 243 (Fig. 2) toward the left, as viewed in Fig. 2, rotating the master lever 228 clockwise (Fig. 2). The links 229, 232 and 231 are thus moved to the right (Fig. 2) causing the arms 224, 226 and 227 and their attached vanes 216, 217 and 218 to pivot counterclockwise into the position shown in Fig. 6, so as to deflect the air blast issuing from the top of the opening 33 toward the left or closed side of the machine. Naturally, upon the complementary movement of the shutters 156 and 157 in the opposite direction to that above described the right portion of the opening 33 will be closed by the shutter 157 and the three air deflecting vanes will be pivoted so as to deflect air toward the right side of the machine. Through adjustment of the tension of the springs 239 and 241 and their respective cables 242 and 243, and the proper arrangement of the links and levers of the three vane air deflecting assembly it is possible to obtain almost any desired air blast pattern across the top of the opening 33.

Prior to operation of the machine (Fig. 1) the hopper 59 is supplied with a pesticidal dust and the tank 47 is filled with either water or a pesticidal solution. The engine 14 is then started, thus rotating the fan 19 and causing an air blast to issue from the opening 33, the velocity and volume of said air blast being regulated by the speed of the engine 14 whose throttle 21 is controlled by the lever 26 on the control box 27. Operation of the engine 14 also causes the pump 43 to build up pressure in the line 44 and rotates the dust feed shaft 83 to supply dust to the feed housing 68.

Assuming that a row of trees along the right side of the machine is to be treated the operator will actuate the motor 191 to position the left shutter 156 in a completely closed position and the right shutter 157 in a fully open position, as shown in Figs. 1 and 6, so that the air blast will be discharged to the right of the machine. The vanes 216, 217 and 218 will then be tilted counterclockwise from the vertical (Fig. 6) and will deflect the upper portion of the air blast toward the upper left side of the machine in order to increase the transverse width of the air blast pattern. When the machine is in position to begin the application of pesticide to the trees the operator will adjust the control levers 49 and 118 for the liquid valve 42 and the dust feed slide 103, respectively, to supply the desired amount of spray material and pesticidal dust to the air blast emanating from the opening 33. As previously described, complete closing of the left shutter 156 closes the control valve 211 in the hose line 38 supplying liquid to the left header pipe 36, thereby preventing the spraying of liquid over the closed left portion of the discharge opening 33 to effect a saving of said liquid.

When it is desired to treat trees, or the like, located on both sides of the machine the operator, by manipulation of the switch 196, may place the shutters 156 and 157 in any complementary position he wishes. Usually, he will place both shutters in a half open position so that the pattern of the pesticidal fog formed by the machine will be identical on opposite sides thereof and both rows of trees will be similarly treated. It will be noted that since the discharge opening is wider across its top and upper side portions, see Fig. 1, the pesticidal fog emanating therefrom will be more voluminous than that emitted from the lower side portions thereby providing for thorough coverage of the top and upper side portions of the trees which are naturally further removed from the machine.

While I have described a preferred embodiment of the present invention, it will be understood that various changes and modifications may be made in the details thereof without departing from the spirit and scope of the appended claims.

Having thus described the invention what I claim as new and desire to protect by Letters Patent is:

1. A pesticide distributing apparatus comprising a fan having an air impelling blade, means rotatably mounting said fan, means for rotating said fan to create a blast of air, and means actuated by said fan for discharging pesticide into said blast at a point substantially within the rotational path of said blade.

2. A pesticide distributing apparatus comprising a fan having a plurality of spaced air impelling blades, means rotatably mounting said fan, means for rotating said fan to create a stream of air, means mounted for rotation with the fan for feeding pesticide directly into the space between said blades for acceptance by said air stream, and means actuated by the fan for delivering pesticide to said discharging means.

3. A pesticide distributing apparatus comprising a fan having a plurality of spaced air impelling blades and a pesticide discharge orifice between said blades, means rotatably mounting said fan, means for rotating said fan to create a blast of air, and means actuated by said fan for discharging pesticide from said orifice for entrainment in the air blast.

4. A pesticide distributing apparatus comprising a rotatably mounted fan, means for rotating said fan to create a primary air stream, said fan having a passage provided with an air inlet orifice positioned outside said primary air stream and an air discharge orifice arranged for exposure to said primary air stream, said fan being effective upon rotation thereof to cause a secondary stream of air to flow through said passage and out said discharge orifice, and means for supplying pesticide to the secondary air stream flowing through said passage.

5. A pesticide distributing apparatus comprising a rotatably mounted air blast creating fan having a frusto-conical air deflecting surface and an open-ended passage having one of its ends arranged for exposure to said air blast and the other of its ends shielded from said air blast, whereby upon rotation of said fan a stream of air is drawn through said passage and into said air blast; and means for delivering pesticide to the air stream flowing through said passage.

6. A pesticide distributing apparatus comprising a rotatably mounted air blast creating fan having a frusto-conical air deflecting surface coaxial with the axis of rotation of said fan, a series of air impelling blades secured on said frusto-conical surface in circumferentially spaced relationship, and a plurality of outwardly extending open-ended passages having their outer ends disposed substantially between said blades and their inner ends disposed adjacent the rotational axis of said fan, whereby upon rotation of said fan a stream of air is drawn outwardly through said passages and into said air blast; and means for delivering pesticide to the air streams flowing through said passages.

7. A rotary fan for disseminating fluent material comprising a chambered hub having a frusto-conical air deflecting surface, a fluent material discharge means provided with an orifice, and a discharge passageway connecting said orifice with said hub chamber; and an air impelling blade supported from said hub with its rear face disposed adjacent said discharge orifice.

8. A pesticide distributing apparatus comprising a fan having an air impelling blade, means rotatably mounting said fan, means for rotating said fan to create a blast of air, means for discharging powdered pesticide into said blast at a point substantially within the rotational path of said blade, and means for discharging liquid pesticide into said air blast at the air discharge side of said fan.

9. A pesticide distributing apparatus comprising means for creating an air blast, a discharge head adapted to receive said air blast and to discharge it through an opening therein, a pair of movably mounted shutters adapted to control the flow of air through different portions of said opening, actuating means for said shutters adapted to simultaneously move one of said shutters to closed position and to open the other shutter, and means for delivering pesticide to said air blast.

10. A pesticide distributing apparatus comprising means for creating an air blast, a discharge head adapted to receive said air blast and to discharge it through an opening therein, a movably mounted shutter adapted to control the flow of air through a portion of said opening, means for delivering pesticide to the air blast issuing from the shuttered portion of said opening, means for moving said shutter, and means responsive to the closing of said shutter to cut off the delivery of said pesticide.

11. A pesticide distributing apparatus comprising means for creating an air blast, a discharge head adapted to receive said air blast and to discharge it through an opening therein, a movably mounted shutter adapted to control the flow of air through a first portion of said opening, means for moving said shutter, a movably mounted vane positioned in the path of the air flowing through a second portion of said opening, means operatively interconnecting said shutter and said vane and adapted upon movement of said shutter toward a closed position to move said vane into a position where it will deflect the air issuing from said second portion of the opening in the direction of said first portion of the opening, and means for delivering pesticide to said air blast.

References Cited in the file of this patent

UNITED STATES PATENTS

| | | |
|---|---|---|
| 404,428 | Paine | June 4, 1889 |
| 568,776 | Leggett | Oct. 6, 1896 |
| 588,908 | Heslop | Aug. 24, 1897 |
| 1,330,763 | Lemons | Feb. 10, 1920 |
| 1,624,321 | Dunnagan | Apr. 12, 1927 |
| 1,862,666 | Duncan | June 14, 1932 |
| 1,864,740 | Knapp et al. | June 28, 1932 |
| 2,282,828 | Root | May 12, 1942 |
| 2,592,612 | Smith | Apr. 15, 1952 |
| 2,667,717 | Daugherty | Feb. 2, 1954 |